US008188923B2

(12) United States Patent
Ferreol et al.

(10) Patent No.: US 8,188,923 B2
(45) Date of Patent: May 29, 2012

(54) METHOD OF MULTI-TRANSMITTER AND MULTI-PATH AOA-TDOA LOCATION COMPRISING A SUB-METHOD FOR SYNCHRONIZING AND EQUALIZING THE RECEIVING STATIONS

(75) Inventors: Anne Ferreol, Colombes (FR); Philippe Morgand, Athis-Mons (FR)

(73) Assignee: Thales, Neuilly sur Seine (FR)

( * ) Notice: Subject to any disclaimer, the term of this patent is extended or adjusted under 35 U.S.C. 154(b) by 0 days.

(21) Appl. No.: 12/744,154

(22) PCT Filed: Nov. 21, 2008

(86) PCT No.: PCT/EP2008/066027
§ 371 (c)(1),
(2), (4) Date: Feb. 3, 2011

(87) PCT Pub. No.: WO2009/065943
PCT Pub. Date: May 28, 2009

(65) Prior Publication Data
US 2011/0140966 A1    Jun. 16, 2011

(30) Foreign Application Priority Data
Nov. 23, 2007  (FR) .................................. 07 08219

(51) Int. Cl.
*G01S 3/02* (2006.01)
(52) U.S. Cl. ........................................................ 342/464
(58) Field of Classification Search .................. 342/464
See application file for complete search history.

*Primary Examiner* — Harry Liu
(74) *Attorney, Agent, or Firm* — Stroock & Stroock & Lavan LLP

(57) ABSTRACT

Method and system for locating one or more transmitters in the potential presence of obstacles in a network comprising a first receiving station A and a second receiving station B that is asynchronous with A. The method includes the identification of a reference transmitter through an estimation of its direction of arrival AOA-TDOA pair ($\theta_{ref}$, $\Delta\tau_{ref}$) on the basis of the knowledge of the positions of the reference transmitter and of stations A and B, an estimation of the direction of arrival of the transmitter or transmitters and of the reflectors (or estimation of the AOA) on station A, and the correction of the errors of asynchronism between station A and station B by using the reference transmitter and the location of the various transmitters on the basis of each pair (AOAi, TDOAi).

4 Claims, 6 Drawing Sheets

US 8,188,923 B2

METHOD OF MULTI-TRANSMITTER AND MULTI-PATH AOA-TDOA LOCATION COMPRISING A SUB-METHOD FOR SYNCHRONIZING AND EQUALIZING THE RECEIVING STATIONS

CROSS REFERENCE TO RELATED APPLICATIONS

This application is the U.S. National Phase application under 35 U.S.C. §371 of International Application No. PCT/EP2008/066027, filed Nov. 21, 2008, and claims the benefit of French Patent Application No. 0708219, filed Nov. 23, 2007, all of which are incorporated by reference herein. The International Application was published on May 28, 2009 as WO 2009/065958.

FIELD OF THE INVENTION

The invention relates to a method and a system making it possible to locate several transmitters in the presence of reflectors on the basis of several receiving stations with synchronization of the receiving stations.

The invention relates to the location of several transmitters in the presence of reflectors on the basis of several stations. FIG. 1 gives an exemplary location system with 2 receiving stations with position $A_1$ and $A_2$ in the presence of two transmitters with position $E_1$ and $E_2$ and a reflector at $R_1$. According to FIG. 1, the station at $A_i$ receives the direct path of the transmitter $E_m$ at the incidence $\theta_{mi0}$ and the reflected path associated with the reflector $R_j$ at the incidence $\theta_{mij}$. Location of the transmitters requires not only the estimation of the incidence angles $\theta_{mij}$ (AOA abbreviation of "Angle of Arrival") but also the estimation of the associated TDOAs or time differences of arrival $\tau_{mi_1j}-\tau_{mi_2j}$ between the stations $A_{i1}$ and $A_{i2}$. FIG. 2 shows that the AOA/TDOA location of a transmitter at $E_1$ with the stations with position $A_1$ and $A_2$, consists in firstly estimating its direction $\theta$ so as to form a straight line and then in estimating the time difference of arrival $\Delta\tau_{12}$ of the signal transmitted between the two stations so as to form a hyperbola H. The transmitter is then situated at the intersection of the straight line D of direction $\theta$ and of the hyperbola H.

Knowing that a receiving station is composed of one or more receivers, the invention also relates to the processing of antennas which processes the signals of several transmitting sources on the basis of multi-sensor reception systems. In an electromagnetic context the sensors Ci are antennas and the radio-electric sources propagate in accordance with a given polarization. In an acoustic context the sensors Ci are microphones and the sources are sound sources. FIG. 3 shows that an antenna processing system is composed of a network of sensors receiving sources with different angles of arrival $\theta_{mp}$. The elementary sensors of the network receive the signals from the sources possibly being either the direct path transmitted by a transmitter or its reflected path with a phase and an amplitude depending in particular on their angles of incidence and the position of the reception sensors. In FIG. 5 is represented a particular network of sensors where the coordinates of each sensor are $(x_n, y_n)$. The angles of incidence are parametrized in 1D by the azimuth $\theta_m$ and in 2D by the azimuth $\theta_m$ and the elevation $\Delta_m$. According to FIG. 4, 1D goniometry is defined by techniques which estimate solely the azimuth by assuming that the waves from the sources propagate in the plane of the sensor network. When the goniometry technique jointly estimates the azimuth and the elevation of a source, it corresponds to 2D goniometry.

BACKGROUND OF THE INVENTION

The main objective of antenna processing techniques is to utilize the spatial diversity which consists in using the position of the antennas of the network to better utilize the differences in incidence and in distance of the sources.

One of the technical problems to be solved in this field is that of the location of transmitters consisting in determining their coordinates, which will be envisaged in 2 dimensions or 2D, in the plane and/or in 3 dimensions or 3D, in space, on the basis of measurements of AOA and/or TDOA type. Multi-transmitter location requires a transmitter-based association of the parameters of AOA/TDOA type, hence joint estimation of the AOA/TDOA parameters.

The field of AOA estimation in the presence of multi-transmitters and multi-paths on the basis of a multi-channel receiving station is very vast. That of TDOA estimation is just as wide as that of AOA with in particular the techniques according the prior art. However, most of the time the measurement is performed on the basis of two signals arising from two single-channel stations. These techniques are then not very robust in multi-transmitter or multi-path situations. This is why the prior art proposes TDOA techniques making it possible to separate the sources on the basis of a priori knowledge about their cyclic characteristics.

AOA/TDOA joint estimation has generated a large number of references such as described in the prior art. These works are much more recent than the previous ones on TDOA and are due essentially to the advent of cellular radio-communications systems as indicated explicitly in documents of the prior art. Unlike the previous references for TDOA, the processes are performed with multi-channel receiving stations. However, the objective is to carry out the parametric analysis of a multi-path channel from a single transmitter $E_1$ to a multi-channel receiving station at $A_1$. The jointly estimated parameters are then the angles of arrival $\theta_{11j}$ and the time deviations $\tau_{11j}-\tau_{11j'}$ between the paths of this same transmitter due to reflectors at $R_j$ and $R_{j'}$. This kind of system does not make it possible to carry out the location of the transmitter at $E_1$ such as is envisaged in FIG. 1, unless the positions of the reflectors at $R_j$ and $R_{j'}$ are known. The joint estimation of the parameters $(\theta_{11j}, \tau_{11j}-\tau_{11j'})$ is very often envisaged on the basis of the knowledge of a pilot signal such as the TSC sequence codes (Training Sequence Code) for GSM (Global System Mobile) or the spreading codes for signals of CDMA (Code Division Multiple Access) type.

TOA (Time Of Arrival) estimation techniques have been envisaged for locating mobiles in cellular radio-communications systems and for locating radio-navigation receivers of GPS/GALILEO type for the Global Positioning System. These estimation techniques are performed on the basis of the knowledge of a pilot signal and can be carried out with multi-channel receiving stations. Location often requires the demodulation of transmitted signals which returns, for example, the position of the satellites in GPS/GALILEO and allows location of the receiver on the basis of the knowledge of the position of the satellites as well as the estimation of the TOA on each of the satellites. The TOA estimation and location techniques then require an accurate knowledge of the operation and characteristics of the radio-navigation or radio-communications system but they do not make it possible to carry out location in the general case without a priori knowledge of system type or of signal type.

The location of a transmitter on the basis of the AOA/TDOA parameters has spawned a significant bibliography. These data processing techniques are generally suited to mono-transmitter situations and sometimes envisage problems with tracking when the transmitter is in motion or else one of the receiving stations is intentionally in motion. In this field numerous references use Kalman filtering. However, these location techniques do not deal with the case of TDOA measurements performed on asynchronous receiving stations. In the prior art the authors propose a direct estimation of the position of the transmitters on the basis of the set of signals originating from all the reception channels of all the stations. In this paper, the authors deal with the problem of multi-sources through algorithms known from the prior art. It directly estimates the positions of the transmitters through an antenna processing approach. However, it assumes that all the signals have the same bandwidth and that the signals originating from the various stations are synchronous. This approach does not, however, make it possible to deal with the problem of the multi-paths generated by reflectors and the problem of asynchronism between the various stations.

SUMMARY OF THE INVENTION

In an embodiment, the invention relates to a method for locating one or more transmitters Ei in the potential presence of obstacles Rp in a network comprising at least one first receiving station A and one second receiving station B asynchronous with A characterized in that it comprises at least the following steps:

- The identification of a reference transmitter of known position $E_0$ by a calculation of the AOA-TDOA pair $(\theta_{ref}, \Delta\tau_{ref})$ on the basis of the knowledge of the position E0 of the reference transmitter and of those of the stations at A and B,
- An estimation of the direction of arrival of the transmitter or transmitters and of the reflectors (or estimation of the AOA) on the first station A,
- The separation of the signals received on the first station A by spatial filtering in the direction of the source (transmitters and/obstacles),
- The separation of the incidences originating from the transmitters from those originating from the obstacles by inter-correlating the signals arising from the spatial filtering at A.
- The estimation of the time difference of arrival or TDOA of a source (transmitters and/obstacles) by inter-correlating the signal of the source (transmitters and/obstacles) received at A with the signals received on the second receiving station B: for each transmitter source Ei (or obstacles Rj) a pair (AOA, TDOA) is then obtained,
- A synthesis of the measurements of the pairs (AOAi, TDOAi) of each source (Ei, Rp) so as to enumerate the sources and to determine the means and standard deviation of their AOA and TDOA parameters,
- The determination of the error of synchronism between the receiving stations A and B by using the reference transmitter $E_0$, and then the correction of this error on all the TDOAi of the pairs (AOAi, TDOAi) arising from the synthesis,
- The determination of the orientation error of the network at A by using the reference transmitter $E_0$, and then the correction of this error on all the AOAi of the pairs (AOAi, TDOAi) arising from the synthesis,
- The location of the various transmitters on the basis of each pair (AOAi, TDOAi).

BRIEF DESCRIPTION OF DRAWINGS

Other characteristics and advantages of the present invention will be more apparent on reading the description which follows of an exemplary embodiment given by way of wholly non-limiting illustration, accompanied by the figures which represent.

DETAILED DESCRIPTION OF THE INVENTION

Figure 6:
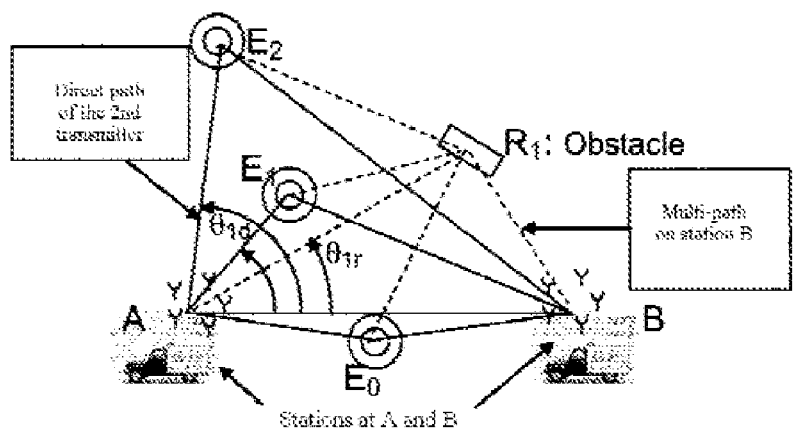

FIG. 6 represents a location system according to the invention comprising for example the following elements:

M transmitters $E_m$ of unknown positions,

P reflectors $R_p$ of unknown positions, a multi-channel receiving station at A. The station A comprises a network of sensors since it affords the goniometry function. The orientation of the antenna of the goniometer at A is for example known approximately to within $\Delta\theta=15°$. This corresponds to the typical accuracy of a magnetic compass, a single- or multi-channel receiving station at B having at least one reception sensor, a reference transmitter at $E_0$ whose position is known. The signal transmitted by this transmitter possesses a transmit band of the same order of magnitude as that of the receivers at A and B.

The various parameters of the location system are given in FIG. 6. In this system, one of the objectives of the location is to determine the position of the M transmitters $E_m$ of unknown positions. To summarize, the method according to the invention executes at least the following steps:

A goniometry (or estimation of the AOA) of the transmitters Em and of the reflectors Rp on the station A, A separation of the signals transmitted by spatial filtering in the direction of the source (transmitter or reflector), The estimation of the time difference of arrival or TDOA of a source by inter-correlating the signal of a source at the output of the spatial filtering at A with the signals received at B: for each source (transmitter Ei or reflector Rj) an (AOA, TDOA) pair is obtained. This inter-correlation technique making it possible to estimate the TDOA, will be performed jointly with the remote "gauging" of the receivers at B, for example.

A synthesis of the measurements of the (AOA, TDOA) pairs of each source will be performed so as to enumerate the transmitters Em and the reflectors Rp corresponding to the obstacles and to give statistics, such as the means and standard deviation associated with the accuracy of estimation of the AOA and TDOA parameters.

The identification of the reference transmitter E0 by an AOA technique from among the (AOA, TDOA) pairs arising from the synthesis. Knowing the position of the reference transmitter $E_0$, the calculation of the error of synchronism between the stations A and B and then the correction of this error on all the TDOAs of the (AOA, TDOA) pairs arising from the synthesis. Knowing the position of the reference transmitter $E_0$, the calculation of the orientation error of station A and then the correction of this error on all the AOAs of the (AOA, TDOA) pairs arising from the synthesis.

The location of the various transmitters and reflectors on the basis of each (AOA, TDOA) pair and the establishment of the uncertainty ellipse on the basis of the measurements of standard deviation of these parameters for each of the transmitters and reflectors.

The calibration error impacting on the goniometry is known,

The number K of time slices of duration T over which a joint estimation of the AOA-TDOA parameter pairs will be performed is chosen.

The method implemented by the invention is described in more detail hereinafter.

Modeling of the Signal on Station A

In the presence of M transmitters and P obstacles or reflectors, the signal received as output from the N sensors at A may be written in the following manner according to FIG. 6.

$$x(t) = \sum_{m=1}^{M} a(\theta_{md}) s_m(t - \tau_m) + \sum_{p=1}^{P} a(\theta_{pr}) b_p(t) + n(t) \quad (1)$$

where $s_m(t)$ is the signal of the m-th transmitter, $\theta_{md}$ and $\theta_{pr}$ are respectively the directions of arrival of the direct path and of a reflected path and $\tau_m$ is the Time Of Arrival (TOA) of the m-th transmitter such that $$\tau_m = \frac{\|E_m A\|}{c}. \quad (2)$$

where $\|AB\|$ is the distance between the points A and B. The signal $b_p(t)$ is associated with the p-th obstacle and satisfies:

$$b_p(t) = \sum_{m=1}^{M} \rho_{mp} s_m(t - \tau_{mp}). \quad (3)$$

where $\tau_{mp}$ is the TOA of the multi-path of the m-th source such that:

$$\tau_{mp} = \frac{\|E_m R_p\| + \|R_p A\|}{c}. \quad (4)$$

and $\rho_{mp}$ is the attenuation of the multi-path of the m-th source caused by the p-th obstacle. The signal of the direct path $s_m(t-\tau_m)$ is correlated with the signal $b_p(t)$ originating from the obstacle in the following manner $$r_{mp} = \frac{|E[s_m(t-\tau_m)b_p(t)^*]|}{\sqrt{E[|s_m(t-\tau_m)|^2]E[|b_p(t)|^2]}} = \frac{\rho_{mp} r_{s_m}(\tau_{mp} - \tau_m)}{\sqrt{r_{s_m}(0)\left(\sum_{i=1}^{M} |\rho_{ip}|^2 r_{s_i}(0)\right)}}. \quad (5)$$

where $r_{s_m}(\tau) = E[s_m(t)s_m(t-\tau)^*]$ is the auto-correlation function of the signal $s_m(t)$ and $r_{mp}$ is a normalized coefficient between 0 and 1 giving the degree of correlation between $s_m(t-\tau_m)$ and $b_p(t)$. When the passband of the m-th transmitter equals $B_m$, the function $r_{s_m}(\tau)$ can be written $$r_{s_m}(\tau) = \gamma_m \frac{\sin(\pi B_m \tau)}{\pi B_m \tau} \text{ with } \gamma_m = E[|s_m(t)|^2]. \quad (6)$$

when M=P=1, the expression for $r_{s_1 b_1}$ may be written in the following manner according to (2)(4)(5)(6)

$$r_{11} = \frac{|r_{s_1}(\tau_{11} - \tau_1)|}{r_{s_1}(0)} = \mathrm{sinc}\left(\pi \frac{B_1 D_{11}}{c}\right) \text{ with} \quad (7)$$

$$D_{mp} = \|E_m R_p\| + \|R_p A\| - \|E_m A\|.$$

where $\sin c(x) = \sin(x)/x$. When x is small the latter function becomes $\sin c(x) \approx 1 - x^2/6$. Under these conditions and according to (5)(7), the correlation level $r_{mp}$ depends on the distance $D_{mp}$: $r_{mp} \approx 1 - (\pi B_m D_{mp}/c)^2/6$ in the following manner:

Inversely $D_{mp} = c/(\pi B_m)\sqrt{6(1-r_{mp})}$. By using the above expressions, the multi-paths can be classed into the following three categories:

Decorrelated cases: $r_{mp} \approx 0$ such that $D_{mp} > c/B_m$

Correlated cases: $0 < r_{mp} < r_{max}$ such that $c/B_m < D_{mp} < c/(\pi B_m)\sqrt{6(1-r_{max})}$ Coherent case: $r_{mp} > r_{max}$ such that $D_{mp} > c/(\pi B_m)\sqrt{6(1-r_{max})}$ In practice $r_{max}=0.9$ is a typical correlation value for separating the cases of coherent multi-paths from the cases of correlated multi-paths. The following chart then gives the inter-path distance limits for obtaining coherent paths.

CHART 1

| | Distance limit for obtaining coherent paths | | |
|---|---|---|---|
| $B_m$ (MHz) | 300 kHz | 1 MHz | 10 MHz |
| Limit distance for obtaining coherent paths | <246 m | <74 m | <7 m |

Modeling of the Signal on Station B

The expression for the signal received on the sensors or receivers of station B is similar to that of equation (1). However:

The angles of incidence of the transmitters Em and of the obstacles or reflector Rp are different: $\theta_{md}'$ and $\theta_{pr}'$ instead of $\theta_{md}$ and $\theta_{pr}$ The instants of arrival (TOA) of the transmitters Em and of the obstacles Rp are different: $\tau_m'$ and $\tau_{mp}'$ instead of $\tau_m$ and $\tau_{mp}$ where $$\tau_m' = \frac{\|E_m B\|}{c} \text{ and } \tau_{mp}' \frac{\|E_m R_p\| + \|R_p B\|}{c}. \tag{8}$$

Figure 7:
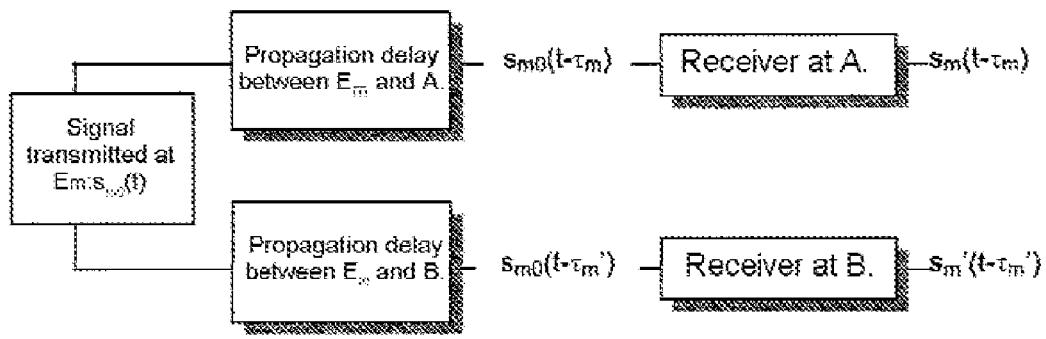

Moreover, the signal of the direct path at the output of the receivers B may be written $s_m'(t-\tau_m')$. Noting that this signal may be written $s_m(t-\tau_m)$ at the output of the receivers of station A, the difference between the signals $s_m(t)$ and $s_m'(t)$ is due to the difference in the frequency templates (term known in the art) of the receivers of the stations A from those of the station B. This distortion caused by receivers of different nature is illustrated in FIG. 7.

To be more precise, in the presence of M transmitters and P obstacles or reflectors, the signal received as output from the N sensors at B may be written in the following manner according to FIG. 6

$$x_B(t) = \sum_{m=1}^{M} a(\theta_{md}')s_m'(t - \tau_m') + \sum_{p=1}^{P} a(\theta_{pr}')b_p'(t) + n_B(t). \tag{9}$$

where $s_m'(t)$ is the signal of the m-th transmitter, $\theta_{md}'$ and $\theta_{pr}'$ are respectively the directions of arrival of the direct path and of the reflected path and $\tau_m'$ is the Time Of Arrival (TOA) of the m-th transmitter, the expression for which is given by equation (8). The signal $b_p'(t)$ is associated with the p-th obstacle and satisfies $$b_p'(t) = \sum_{m=1}^{M} \rho_{mp}' s_m'(t - \tau_{mp}') \tag{10}$$

where $\tau_{mp}'$ is the TOA of the multi-path of the m-th source of equation (8) and $\tau_{mp}'$ is the attenuation of the multi-path of the m-th source caused by the p-th obstacle (or reflector).

Elementary Modules for AOA and TDOA Estimation

Goniometry or Estimation of the Angle of Arrival AOA

The goniometry or AOA estimation algorithms must process the case of multi-transmission. With the objective of additionally taking into account the problem of multi-paths, the method can implement two different algorithms:

The MUSIC scheme in the absence of coherent multi-paths

The coherent MUSIC scheme (More generally, this involves the auto-calibration algorithm known in the prior art) in the presence of coherent paths, applied when the MUSIC scheme does not lead to satisfactory results.

It will be considered that it is necessary to apply the Coherent MUSIC scheme when for example the estimated correlation $\hat{r}_{mp}$ between the paths is larger than $r_{max}$ possibly typically being fixed at 0.9. It will also be decided to apply coherent MUSIC when the MUSIC scheme has failed.

On output from the goniometry the sources (transmitters and obstacles) are identified either as direct path or as secondary path by a temporal criterion: The path in the lead over the others is the direct path.

The MUSIC and Coherent MUSIC algorithms are based on the properties of the covariance matrix $R_x=E[x(t)x(t)^H]$ of the observation vector x(t) of equation (1) where E[.] is the mathematical expectation and $^H$ the conjugation and transposition operator. According to (1), the covariance matrix may be written $$R_x = AR_s A^H + \sigma^2 I_N \text{ where } R_s = E[s(t)s(t)^H] \text{ and } E[n(t)n(t)^H] = \sigma^2 I_N \tag{11}$$

And where $$s(t) = \begin{bmatrix} s_1(t-\tau_1) \\ \vdots \\ s_M(t-\tau_M) \\ b_1(t) \\ \vdots \\ b_P(t) \end{bmatrix} \text{ and} \tag{12}$$

$$A = [\, a(\theta_{1d}) \; \ldots \; a(\theta_{Md}) \; a(\theta_{1r}) \; \ldots \; a(\theta_{Pr}) \,].$$

The two schemes are based on the decomposition into eigenelements of $R_x$ where the vectors $e_k$ are the eigenvectors associated with the eigenvalue $\lambda_k$ where $(\lambda_1 \geq \lambda_2 \geq \ldots \geq \lambda_N)$. K is defined as being the rank of the matrix $R_s$ such that $\lambda_1 \geq \ldots \geq \lambda_K \geq \sigma^2 = \lambda_{K+1} \ldots = \lambda_N$. The two schemes will be differentiated by:

The structure of the eigenvectors $e_k$ of the signal space ($1 \leq k \leq K$)

The value K of the rank of the matrix $R_x$.

The two schemes have in common that they utilize the orthogonality between the eigenvectors of the signal space ($1 \leq k \leq K$) and the eigenvectors of the noise space ($K+1 \leq k \leq N$). The criteria associated with the two schemes will require the calculation of the noise projector where $$\Pi_b = \sum_{i=K+1}^{N} e_i e_i^H. \tag{13}$$

In practice the estimate $\hat{\Pi}_b$ of the noise projector is deduced from the following estimate $\hat{R}_x(T_0)$ of the covariance matrix $R_x$ $$\hat{R}_x(T_0) = \frac{1}{T_0} \sum_{t=1}^{T_0} x(t)x(t)^H. \tag{14}$$

Case of Non-Coherent Path and Application of MUSIC

In this case the rank of the matrix $R_x$ equals K=M+P since the covariance matrix of the sources $R_s$ is of full rank. Under these conditions, the K eigenvectors of the signal space may be written:

$$e_k = \sum_{k=1}^{K} \alpha_k a(\theta_k) \text{ for } (1 \leq k \leq K). \tag{15}$$

In this particular case the matrix A is of dimension N×K since $A=[a(\theta_1) \ldots a(\theta_K)]$. Knowing that the decomposition into eigenelements of $R_x$ induces the orthogonality between the $e_k$ of the signal space of equation (15) and the $e_i$ of the noise space of equation (13), the vectors $a(\theta_k)$ are orthogonal to the columns of the noise projector $\Pi_b$. Under these conditions, the incidences $\theta_k$ of the K sources are the K minima which cause the following MUSIC criterion to vanish:

$$J_{MUSIC}(\theta) = \frac{a(\theta)^H \Pi_b a(\theta)}{a(\theta)^H a(\theta)}. \quad (16)$$

The MUSIC criterion $J_{MUSIC}(\theta)$ is calculated for θ ranging from 0 to 360° and is normalized between 0 and 1 since for all θ it satisfies: $0 \leq J_{MUSIC}(\theta) \leq 1$.

In the method two techniques can be implemented for detecting the presence of coherent sources:
  A detection of coherent sources by thresholding the criterion $J_{MUSIC}(\theta)$.
  A detection of coherent sources after estimating the level of correlation between the sources.

Detection of Coherent Sources by Thresholding $J_{MUSIC}(\theta)$

In order to better understand the choice of a threshold the behavior of the MUSIC criterion $J_{MUSIC}(\theta)$ is simulated in the presence of two paths with incidences $\theta_{11}=100°$ and $\theta_{12}=200°$ in the coherent and then the non-coherent cases. The result of the simulation is given in FIG. 8. The network of N=5 sensors is circular with a radius of 0.5λ. In this context, good operation of MUSIC is characterized by the fact that $J_{MUSIC}(\theta_{11}=100°)$ and $J_{MUSIC}(\theta_{12}=200°)$ are zero. According to FIG. 8 this good property is satisfied when the two multipaths are non-coherent. In the coherent case, $J_{MUSIC}(\theta_{11}=100°)$ and $J_{MUSIC}(\theta_{12}=200°)$ are on the one hand far from being zero and on the other hand the K=2 smallest minima associated with the estimates $\hat{\theta}_{11}$ and $\hat{\theta}_{12}$ of $J_{MUSIC}(\theta)$ are much further from $\theta_{11}=100°$ and $\theta_{12}=200°$ than in the coherent case. Moreover in the coherent case the dynamic swing between the K=2 smallest minima of the criterion and the following minima is very low, and hence there is a significant risk of estimating ambiguous directions of arrival.

Figure 8:
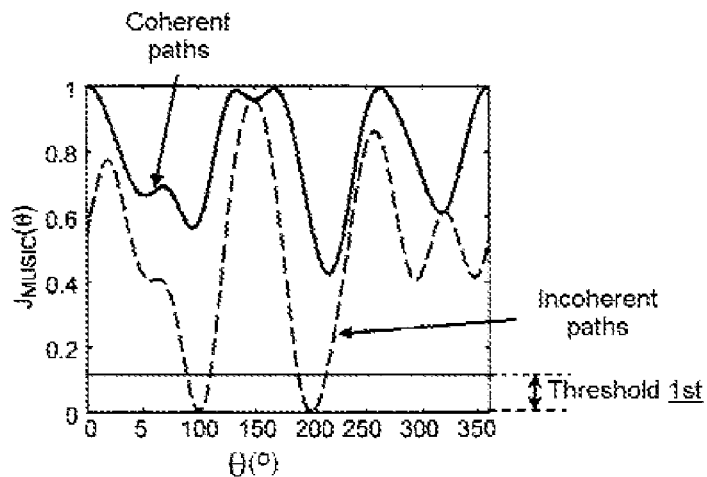

The example of FIG. 8 shows that it is easy to eliminate the poor goniometries $\hat{\theta}_{11}$ and $\hat{\theta}_{12}$ related to the presence of coherent sources by a threshold of good goniometry "threshold_1st". When a minimum $J_{MUSIC}(\hat{\theta}_m)$ satisfies $J_{MUSIC}(\hat{\theta}_m)$ <threshold_1st, the azimuth $\hat{\theta}_m$ is the direction of a non-coherent path and when $J_{MUSIC}(\hat{\theta}_m)$>threshold_1st, the azimuth $\hat{\theta}_m$ is not associated with a direction of arrival. The presence of coherent paths is then detected when the number $\hat{K}$ of minima satisfying $J_{MUSIC}(\hat{\theta}_k)$<threshold_1st is less than the rank K of the covariance matrix $R_x$.

Detection of Coherent Sources by Estimating the Inter-Correlation Level

In this case where K=M+P, the K estimated incidences satisfy $J_{MUSIC}(\hat{\theta}_k)$<threshold_1st. However, it is known moreover that the more significant the level of correlation between the sources, the larger the variance of the estimates $\hat{\theta}_m$. The objective is then to estimate the covariance matrix of the sources $R_s$ of equation (11) on the basis of the estimates of the matrix A as well as the noise level $\sigma^2$. On the basis of the covariance matrix $\hat{R}_x(T_0)$ and of the estimates $\hat{\theta}_1 \ldots \hat{\theta}_K$, the steps of the method are as follows:

Step A.1: On the basis of the result of EVD of $\hat{R}_x(T_0) = \Sigma_{i=1}^{N} \lambda_i e_i e_i^H$, which is used to construct $\Pi_b$, calculation of an estimate of the noise level $$\hat{\sigma}^2 = (\Sigma_{i=K+1}^{N} \lambda_i)/(N-K). \quad (17)$$

Step A.2: Calculation of an estimate of the denoised covariance matrix $R_y = A R_s A^H$ by performing $$\hat{R}_y = \Sigma_{i=1}^{K}(\lambda_i - \hat{\sigma}^2) e_i e_i^H. \quad (18)$$

Step A.3: On the basis of the estimate $\hat{A}=[a(\hat{\theta}_1) \ldots a(\hat{\theta}_K)]$ of the matrix of direction vectors, deduction of an estimate of the covariance matrix of the sources $$\hat{R}_s = A^{\#} \hat{R}_y (A^{\#})^H \text{ where } A^{\#}=(A^H A)^{-1} A^H. \quad (19)$$

Step A.4: Calculation of the maximum correlation $\hat{r}_{max}$ between the paths i.e.

$$\hat{r}_{max} = \max_{i,j}\left(\frac{|\hat{R}_s(i,j)|}{\sqrt{\hat{R}_s(i,i)\hat{R}_s(j,j)}}\right). \quad (20)$$

The estimated correlation $\hat{r}_{mp}$ between the paths is larger than $r_{max}$ possibly typically being fixed at 0.9.

The coherent MUSIC technique will be used when $\hat{r}_{max} > r_{max}$. A typical value of $r_{max}$ is 0.9.

Case of Coherent Path and Application of Coherent MUSIC

In this case the rank of the matrix $R_x$ satisfies K<M+P since the covariance matrix of the sources $R_s$ is no longer of full rank. Under these conditions, the K eigenvectors of the signal space may be written:

$$e_k = \sum_{k=1}^{K} \alpha_k b(\theta_k, \rho_k, I_k) \text{ for } (1 \leq k \leq K < M+P). \quad (21)$$

Where $$b(\theta_k, \rho_k, I_k) = \sum_{p=1}^{I_k} \rho_p a(\theta_{kp}) = U_{I_k}(\theta_k)\rho_k. \quad (22)$$

with $U_{I_k}(\theta_k)=[a(\theta_{k1}) \ldots a(\theta_{kI_k})]$ and $\rho_k=[\rho_{k1} \ldots \rho_{kI_k}]^T$ Where the $\theta_{kp}(1 \leq p \leq I_k)$ are the incidences of the coherent paths associated with the same transmitter, with this model $\Sigma_{k=1}^{K} I_k = M+P$. Knowing that the decomposition into eigenelements of $R_x$ induces the orthogonality between the $e_k$ of the signal space of equation (13) and the $e_i$ of the noise space of equation (15), the vectors $b(\theta_k, \rho_k, I_k)$ are orthogonal to the columns of the noise projector $\Pi_b$. According to (21) (22) and the coherent MUSIC algorithm of [4], the incidences $\theta_k=[\theta_{k1} \ldots \theta_{kI}]$ of the K groups of coherent sources are the K minima which cause the following coherent MUSIC criterion to vanish $$J_{MC}(\theta, I) = \frac{\det(U_I(\theta, P)^H \Pi_b U_I(\theta, P))}{\det(U_I(\theta, P)^H U_I(\theta, P))}. \quad (23)$$

The MUSIC criterion $J_{MC}(\theta, I)$ is calculated for all the I-tuples $\theta=[\theta_1 \ldots \theta_I]$ satisfying $\theta_1 > \ldots > \theta_I$ where the $\theta_i$ vary between 0 and 360°. The criterion $J_{MC}(\theta, I)$ is moreover normalized between 0 and 1 since it satisfies $0 \leq J_{MC}(\theta) \leq 1$. Just as for MUSIC the elimination of the poor I-tuples will be done by way of a threshold of good goniometry "threshold_1st". Consequently, to be valid, the I-tuples $\theta_k=[\theta_{k1} \ldots \theta_{kI}]$ must satisfy $J_{MC}(\hat{\theta}_k)$<threshold_1st. If the number of good I-tuples is less than K, the coherent MUSIC scheme is repeated for I=I+1.

The steps of coherent MUSIC are then as follows:

Step B.1: Initialization to I=2

Step B.2: Calculation of the criterion of equation (23) for all the $\theta=[\theta_1 \ldots \theta_I]$ satisfying $\theta_1 > \ldots > \theta_I$ knowing that the $\theta_i$ vary between 0 and 360°.

Step B.3: Search for the $\hat{K}$ I-tuples satisfying $J_{MC}(\hat{\theta}_k)$ <threshold_$1^{st}$.

Step B.4: If $\hat{K}<K$ then return to step B.2 with I=I+1.

Step B.5: Calculation of the set $\{\hat{\theta}_1 \ldots \hat{\theta}_{M+P}\}$ of incidences of the sources by calculating $\{\hat{\theta}_1 \ldots \hat{\theta}_{M+P}\} = \cap_{i=1}^{\hat{K}} \theta_k$ Separation of the Direct Paths from the Reflected Paths The separation of the paths is performed on the basis of the signal x(t) of equation (1) as well as the estimates of the incidences of the sources $\{\hat{\theta}_1 \ldots \hat{\theta}_{M+P}\}$. According to equations (1) and (12) the signal received can be written:

$$x(t)=As(t)+n(t). \quad (24)$$

Consequently, the vector s(t) is estimated on the basis of an estimate $\hat{A}=[a(\hat{\theta}_1) \ldots a(\hat{\theta}_{M+P})]$ of the matrix A as well as the observation vector x(t) by a spatial filtering technique. By applying a least squares technique $$\hat{s}(t)=(\hat{A}^H\hat{A})^{-1}\hat{A}^H x(t). \quad (25)$$

The i-th component $\hat{s}_i(t)$ of $\hat{s}(t)$ can have the following two expressions according to (12)

$$\hat{s}_i(t) = s_m(t-\tau_m) \quad (26)$$

$$\hat{s}_i(t) = b_p(t) = \sum_{m=1}^{M} \rho_{mp} s_m(t-\tau_{mp}).$$

By considering the following inter-correlation criterion:

$$r_{ij}(\tau) = \frac{|E[\hat{s}_i(t)\hat{s}_j(t-\tau)]|^2}{E[|\hat{s}_i(t)|^2]E[|\hat{s}_j(t-\tau)|^2]}. \quad (27)$$

For i<j, the following two situations are encountered, knowing that the signals of the M transmitters are independent Case n° 1: If $\hat{s}_i(t) = s_m(t-\tau_m)$ and $\hat{s}_j(t) = s_{m'}(t-\tau_{m'})$ then $r_{ij}(\tau) = 0$ (28)

Case n° 2: If $\hat{s}_i(t) = s_m(t-\tau_m)$ and $\hat{s}_j(t) = b_p(t) = \sum_{m'=1}^{M} \rho_{m'p} s_{m'}(t-\tau_{m'p})$ then $$\max_\tau r_{ij}(\tau) = r_{ij}(\tau_{mp} - \tau_m)$$

$$= \frac{|\rho_{mp}|^2 E[|s_m(t)|^2]}{\sum_{m'=1}^{M} |\rho_{m'p}|^2 E[|s_{m'}(t)|^2]}$$

Case n° 3: If $\hat{s}_i(t) = b_{p'}(t)$ and $\hat{s}_j(t) = b_p(t) = \sum_{m'=1}^{M} \rho_{m'p} s_{m'}(t-\tau_{m'p})$ then $$\max_\tau r_{ij}(\tau) = r_{ij}(\tau_{mp} - \tau_{mp'})$$

$$= \frac{[|\rho_{mp}\rho_{mp'}|^2 E[|s_m(t)|^2]]^2}{\left(\sum_{m'=1}^{M} |\rho_{mp'}|^2 E[|s_m(t)|^2]\right)\left(\sum_{m'=1}^{M} |\rho_{mp}|^2 E[|s_m(t)|^2]\right)}.$$

Consequently, the filtering outputs $\hat{s}_i(t)$ associated with the signals $b_p(t)$ are correlated with all the other filtering outputs $\hat{s}_j(t)$ for $1 \leq j \leq M+P$. The signals $\hat{s}_i(t)$ associated with the reflectors (or obstacles) will be those which satisfy $$\max_\tau r_{ij}(\tau) \neq 0$$

for i<k and the other outputs will be associated with the direct path.

In practice $$\max_\tau r_{ij}(\tau)$$

is compared with a threshold η to decide a correlation between $\hat{s}_i(t)$ and $\hat{s}_j(t)$ (A typical value of η is 0.1). The method for separating the direct and reflected paths consisting in identifying the sets $\Theta_d=\{\theta_{1d} \ldots \theta_{Md}\}$ and $\Theta_r=\{\theta_{1r} \ldots \theta_{Pr}\}$ is then as follows:

Step C.0: $\Theta_d=\emptyset$ and $\Theta_r=\emptyset$

Step C.1: Construction of the matrix $\hat{A}=[a(\hat{\theta}_1) \ldots a(\hat{\theta}_{M+P})]$ of the sources consisting of the transmitters and the obstacles on the basis of the set of incidences $\{\hat{\theta}_1 \ldots \hat{\theta}_{M+P}\}$ estimated either by MUSIC or by Coherent MUSIC.

Step C.2: Estimation of the signal vector $\hat{s}(t)$ of dimension (M+P)×1 on the basis of $\hat{A}$ and of the sensor signals x(t) by a spatial filtering technique. An exemplary spatial filtering is given by equation (25).

Step C.3: Initialization to i=1.

Step C.4: Calculation of $$r_{ij}^{max} = \max_\tau r_{ij}(\tau)$$

for $1 \leq j \leq M+P$.

Step C.5: If for $1 \leq j \leq M+P$, $r_{ij}^{max} > \eta$ then $\Theta_r=\{\theta_i\} \cup \Theta_r$.

Step C.6: If for $1 \leq j \leq M+P$, there exists at least one value of j such that $r_{ij}^{max} \leq \eta$ then $\Theta_d=\{\theta_i\} \cup \Theta_d$.

Step C.7: If i<M+P return to step No. C.4 with i=i+1

Method of Goniometry in the Possible Presence of Coherent Multi-Paths

Figure 9:
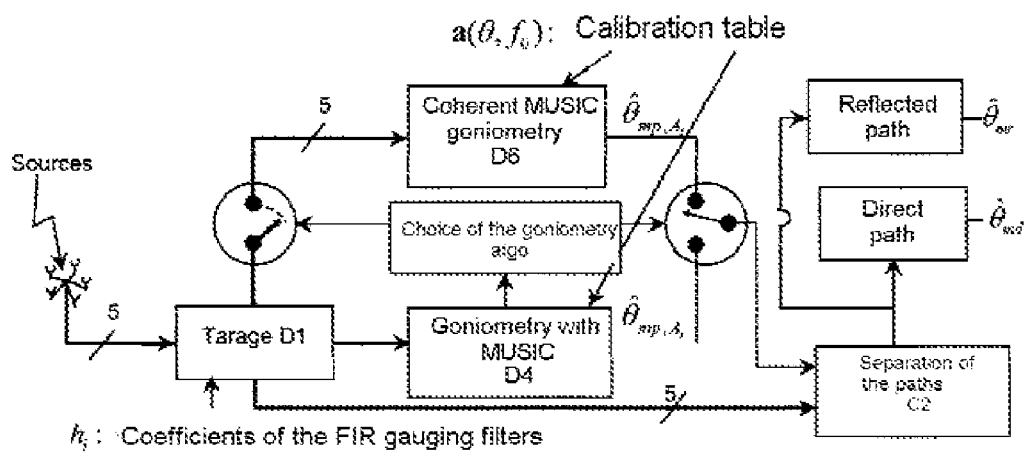

The method of elementary goniometry in the possible presence of multi-paths is represented in the diagram of FIG. 9. More precisely the steps are as follows:

Step D.1: Acquisition of the signal x(t) and correction of the distortions of the receivers by a gauging process known to the person skilled in the art.

Step D.2: Calculation of the covariance matrix $\hat{R}_x(T_0)$ of equation (14);

Step D.3: Following an eigenvalue decomposition or "EVD" of $\hat{R}_x(T_0)$, determination of the rank K of this matrix and construction of the noise projector $\hat{\Pi}_b$ according to equation (13).

Step D.4: Application of MUSIC: Search as a function of θ for the K' minima θ of the criterion $J_{MUSIC}(\theta)$ of equation (16) satisfying $J_{MUSIC}(\hat{\theta}_k)$<threshold_$1^{st}$ for $1 \leq k \leq K'$. If K'<K go to step No. D.6.

Step D.5: Calculation of the maximum degree of correlation $\hat{r}_{max}$ between the sources in accordance with steps No. A.1 to A.4. If $\hat{r}_{max} < r_{max}$ go to step No. D.7 and construction of the set of incidences $\{\hat{\theta}_1 \ldots \hat{\theta}_{M+P}\}$.

Step D.6: Application of the coherent-MUSIC scheme according to steps No. B.1 to B.5 to obtain the set of incidences $\{\hat{\theta}_1 \ldots \hat{\theta}_{M+P}\}$ Step D.7: Construction of the sets of incidences $\Theta_d = \{\theta_{1d} \ldots \theta_{Md}\}$ and $\Theta_r = \{\theta_{1r} \ldots \theta_{Pr}\}$ associated respectively with the direct paths and with the multi-paths on the basis of the set of incidences $\{\hat{\theta}_1 \ldots \hat{\theta}_{M+P}\}$ according to steps C.

Figure 10:
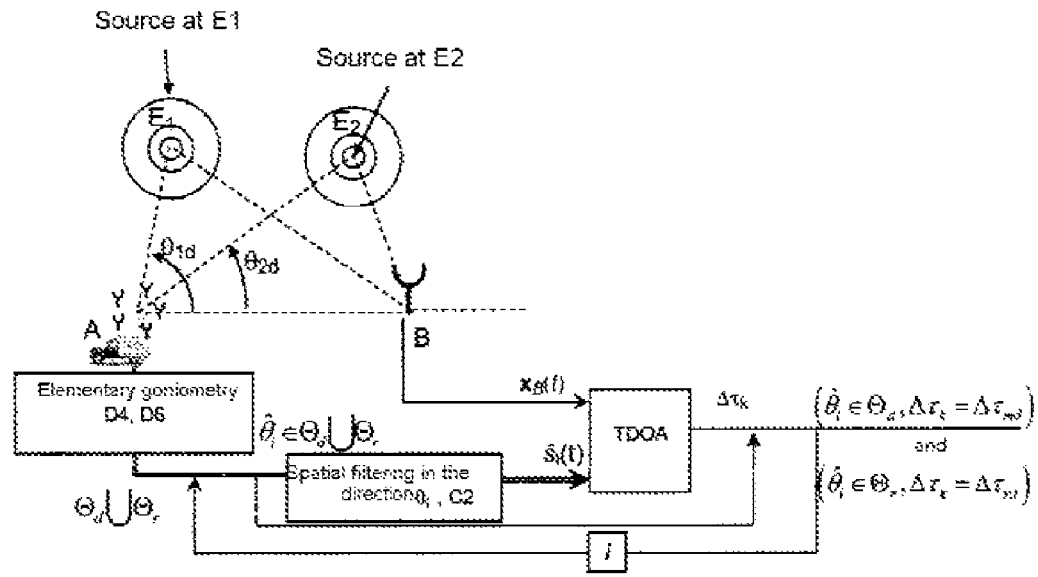

TDOA (Time Difference of Arrival) Estimation FIG. 10

The objective of this paragraph is to estimate the TDOA $\tau_m - \tau_m'$ of each of the direct paths as well as the TDOA $\tau_{mp} - \tau_{mp}'$ of the reflectors which according to (2)(4) satisfy $$\tau_{mp} - \tau_{mp}' = \frac{\|R_p A\| - \|R_p B\|}{c} \text{ and} \tag{29}$$

$$\tau_m - \tau_m' = \frac{\|E_m A\| - \|E_m B\|}{c}.$$

Steps C.1 and C.2 described previously make it possible on the basis of the set of incidences $\{\hat{\theta}_1 \ldots \hat{\theta}_{M+P}\}$ to deduce the signal vector $\hat{s}(t)$ of equation (12). Knowing on the one hand that the i-th component $\hat{s}_i(t)$ of $\hat{s}(t)$ is the signal associated with the source of incidence $\hat{\theta}_i$ and that on the other hand according to steps C previously described it is possible to identify incidences of the direct paths if $\hat{\theta}_i \in \{\theta_{1d} \ldots \theta_{Md}\}$ or of the reflected paths if $\hat{\theta}_i \in \{\theta_{1r} \ldots \theta_{Pr}\}$. Thus:

$$\text{If } \hat{\theta}_i \in \{\theta_{1d} \ldots \theta_{Md}\} \text{ then } \hat{s}_i(t) = s_m(t - \tau_m) \tag{30}$$

If $\hat{\theta}_i \in \{\theta_{1r} \ldots \theta_{Pr}\}$ then $$\hat{s}_i(t) = b_p(t) = \sum_{m=1}^{M} \rho_{mp} s_m(t - \tau_{mp}).$$

The signals $x_B(t)$ received on the reception system at B (see FIG. 6) have the expression of equations (9)(10). In the method, the distortion between the signals $s_m(t)$ and $s_m'(t)$ received respectively at A and B is modeled by the following FIR filter:

$$s_m'(t) = \sum_{i=-L}^{L} h_i s_m(t - iT_e) = \underbrace{[h_{-L} \ldots h_L]}_{h^T} \underbrace{\begin{bmatrix} s_m(t + LT_e) \\ \vdots \\ s_m(t - LT_e) \end{bmatrix}}_{s_m(t)}. \tag{31}$$

Consequently the signal $x_B(t)$ becomes $$x_B(t) = \sum_{m=1}^{M} a(\theta_{md}') h^T s_m(t - \tau_m') + \sum_{p=1}^{P} a(\theta_{pr}') h^T b_p'(t) + n_B(t). \tag{32}$$

Knowing that $b_p'(t) = h^T b_p'(t)$. According to equations (10) (32)

$$b_p'(t) = \sum_{m=1}^{M} \rho_{mp}' s_m(t - \tau_{mp}'). \tag{33}$$

And therefore $$x_B(t) = \tag{34}$$

$$\sum_{m=1}^{M} a(\theta_{md}') h^T s_m(t - \tau_m') + \sum_{p=1}^{P} \sum_{m=1}^{M} \rho_{mp}' a(\theta_{pr}') h^T s_m(t - \tau_{mp}') + n_B(t).$$

Consequently when $\hat{s}_i(t) = s_m(t - \tau_m)$, the difference in the arrival time or TDOA $\tau = \tau_m - \tau_m'$ will correspond to a maximum correlation between the signals $s_m(t - \tau_m)$ and $x_B(t + \tau)$. The multi-channel correlation criterion constructed is based on Gardner's theory [26][27]

$$\hat{c}_{xy}(\tau) = 1 - \det(I_N - \hat{R}_{xx}^{-1} \hat{R}_{xy}(\tau) \hat{R}_{yy}(\tau)^{-1} \hat{R}_{yx}(\tau, f)) \tag{35}$$

$$\hat{R}_{xy}(\tau) = \frac{1}{K} \sum_{k=1}^{K} x(kT_e) y(kT_e + \tau)^H$$

$$\hat{R}_{xx} = \frac{1}{K} \sum_{k=1}^{K} x(kT_e) x(kT_e)^H$$

$$\hat{R}_{yy}(\tau) = \frac{1}{K} \sum_{k=1}^{K} y(kT_e + \tau) y(kT_e + \tau)^H.$$

With $x(t) = s_m(t - \tau_m)$ and $y(t) = x_B(t)$. The TDOA of the m-th source is then $$\tau_m - \tau_m' = \max_{\tau} \hat{c}_{xy}(\tau). \tag{36}$$

According to (34) and in the presence of P obstacles, the function $\hat{c}_{xy}(\tau)$ contains P other maxima in $\tau_m - \tau_{mp}'$ for $1 \leq p \leq P$. Knowing that $\tau_{mp}' > \tau_m'$, the method will retain the TDOA $\tau_m - \tau_m'$ knowing that it satisfies $\tau_m - \tau_m' < \tau_m - \tau_{mp}'$.

When $\hat{s}_i(t) = b_p(t) = \sum_{m=1}^{M} \rho_{mp} s_m(t - \tau_{mp})$ the observation vector is constructed $$b_p(t) = \begin{bmatrix} b_p(t + LT_e) \\ \vdots \\ b_p(t - LT_e) \end{bmatrix} = \sum_{m=1}^{M} \rho_{mp} s_m(t - \tau_{mp}). \tag{37}$$

The TDOA $\tau_{mp} - \tau_{mp}'$ will correspond to a maximum correlation between the signals $b_p(t)$ and $x_B(t + \tau)$. The multi-channel correlation criterion of equation (35) is constructed with $x(t) = b_p(t)$ and $y(t) = x_B(t)$. The correlation criterion $\hat{c}_{xy}(\tau)$ also contains P other correlation maxima in $\tau_{mp}-\tau_m'$. Knowing that $\tau_{mp}'>\tau_m'$, the method will retain the TDOA of interest $\tau_{mp}-\tau_{mp}'$ knowing that it satisfies $\tau_{mp}-\tau_{mp}'<\tau_{mp}-\tau_m'$.

According to the above description the method for associating the angles of arrival and time differences of arrival TDOA is as follows:

Step E.1: Estimation of the signal ŝ(t) on the basis of the incidences $\{\hat{\theta}_1 \ldots \hat{\theta}_{M+P}\}$ and of the signal x(t) of equation (1) according to the method of steps C.1 and C.2 described previously.

Step E.2: i=1 $\Psi_d=\emptyset$ and $\Psi_r=\emptyset$

Step E.3: On the basis of the i-th component $\hat{s}_i(t)$ of ŝ(t) construction of the vectors $x(t)=[\hat{s}_i(t+LT_e) \ldots \hat{s}_i(t-LT_e)]^T$ and $y(t)=x_B(t)$ and then construction of the criterion $\hat{c}_{xy}(\tau)$ of equation (35).

Step E.4: Search for the P' maxima $\Delta\tau_k$ of the criterion $\hat{c}_{xy}(\tau)$ such that $\hat{c}_{xy}(\Delta\tau_k)>\eta$.

Step E.5: If $\hat{\theta}_i \in \{\theta_{1d} \ldots \theta_{Md}\}$ this corresponds to the presence of a direct path and $\Delta\tau_{md}=\min\{\Delta\tau_k$ pour $1 \leq k \leq P'\}$: $\Psi_d=\Psi_d \cup \{(\hat{\theta}_i, \Delta\tau_{md})\}$.

Step E.6: If $\hat{\theta}_i \in \{\theta_{1r} \ldots \theta_{Pr}\}$ corresponds to the presence of a multi-path and $\Delta\tau_{mr}=\min\{\Delta\tau_k$ for $1 \leq k \leq P'\}$: $\Psi_r=\Psi_r \cup \{(\hat{\theta}_i, \Delta\tau_{md})\}$.

Step E.7: i=i+1 and if then return to step E.3.

Location Module

Figure 1:
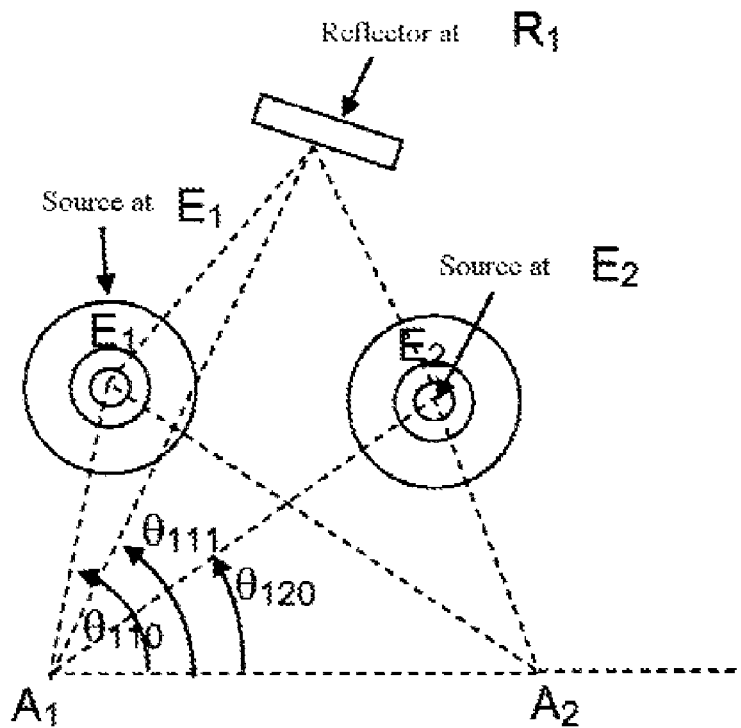
FIG. 1, a location system comprising receiving stations at Ai and transmitters at $E_m$, FIG. 2, an example of AOA/TDOA location in the presence of a transmitter, FIG. 3, a diagram of a transmitter propagating toward a network of sensors, FIG. 4, the incidences $(\theta_m, \Delta_m)$ of a source, FIG. 5, an example of a network of sensors with position (xn, yn), FIG. 6, a system for location on the basis of the stations A and B in the presence of several transmitters and paths, FIG. 7, the distortion of the signal transmitted between the receivers at A and at B, FIG. 8, the MUSIC criterion in the presence of coherent multi-paths (red curve) and of non-coherent sources (green curve), for directions of multi-paths $\theta_{11}=100°$ and $\theta_{12}=200°$, the network of N=5 sensors is circular with a radius of $0.5\lambda$, FIG. 9, an exemplary elementary Goniometry method taking situations of coherent paths into account, FIG. 10, an illustration of an elementary AOA-TDOA estimation method, FIG. 11, a representation of the technique for the AOA-TDOA location of the transmitter at the position E, and FIG. 12, the AOA-TDOA location uncertainty ellipse.
Figure 2:
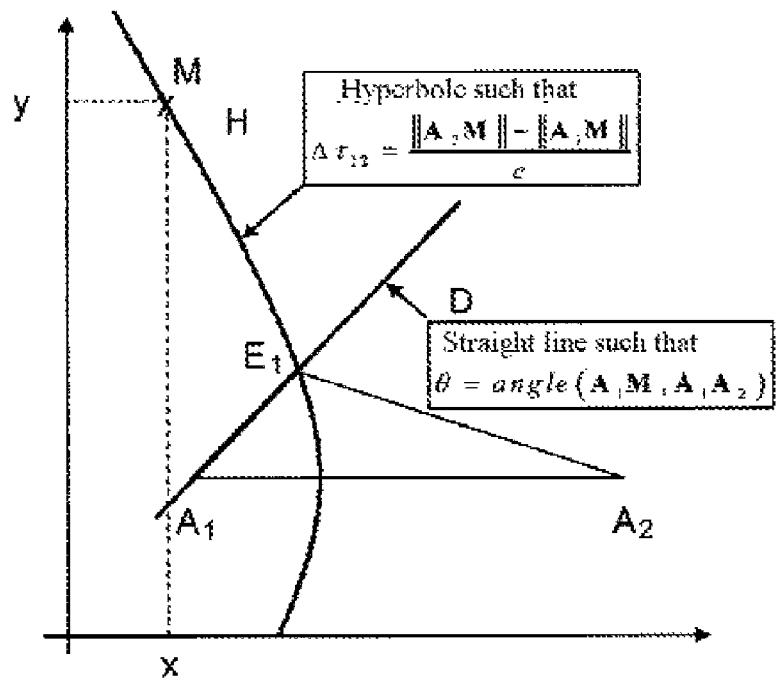
Figure 3:
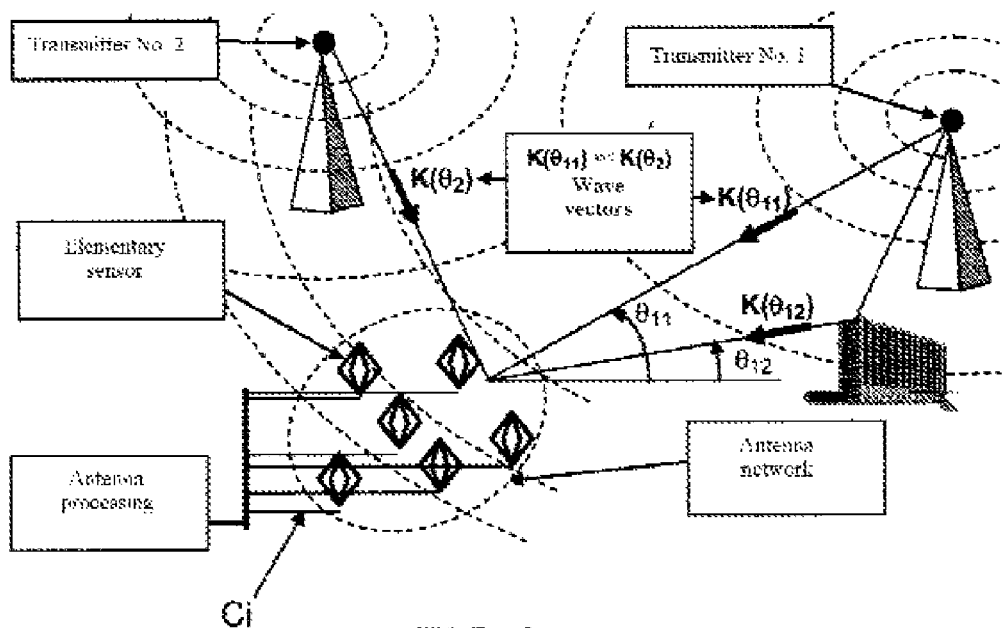
Figure 4:
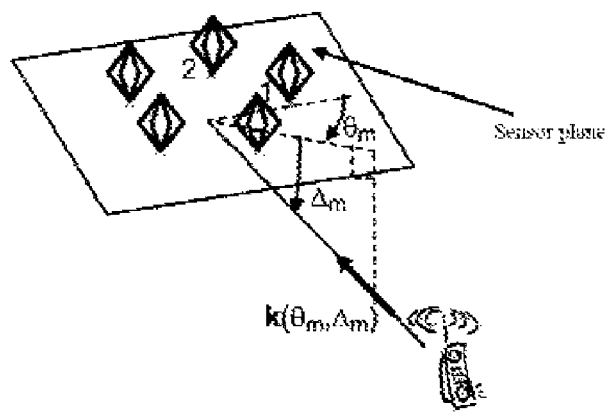
Figure 5:
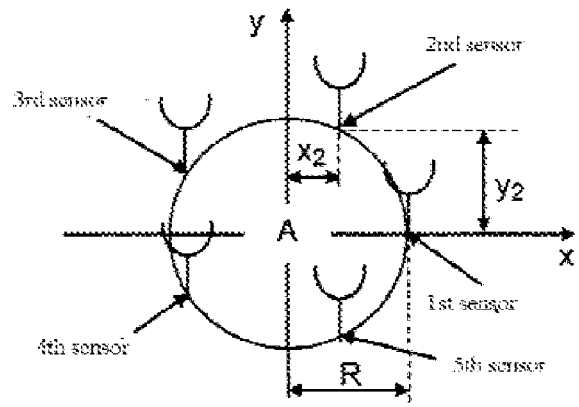
Figure 11:
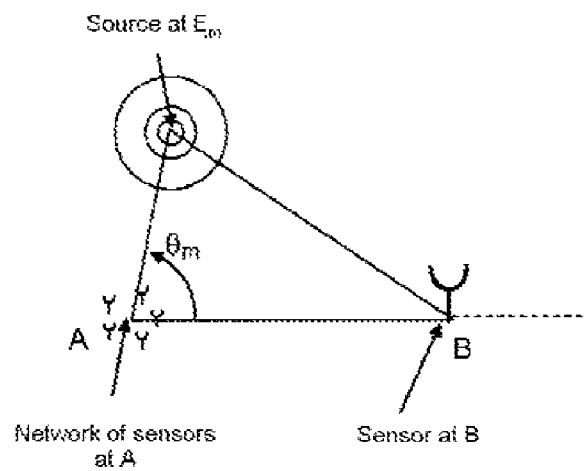

Location of a Source (Transmitter-Obstacle) on the Basis of a Pair of AOA-TDOA Parameters The AOA-TDOA parameter pairs $(\hat{\theta}_{md}, \Delta\tau_{md})$ and $(\hat{\theta}_{pr}, \Delta\tau_{pr})$ make it possible to locate respectively the transmitters $E_m$ and the reflectors (or obstacles) at $R_p$. According to FIG. 11, the method must determine the position of the transmitter knowing that its direction of arrival is θ and that the TDOA between the two asynchronous stations A and B is $\Delta\tau$. It is therefore necessary to solve the following equation system $$\Delta\tau = \frac{\|BM\| - \|AM\|}{c} \quad (38)$$

and $$\theta = \text{angle } (AM, AB).$$

which has solution $M=E_m$ according to FIG. 4. The coordinates $(x_m, y_m)$ of $E_m$ then satisfy $$x_m = x_A + \frac{(\Delta\tau c)^2 - \|AB\|^2}{2((\Delta\tau c) - \|AB\|\cos(\theta))}\cos(\theta) \quad (39)$$

$$y_m = y_A + \frac{(\Delta\tau c)^2 - \|AB\|^2}{2((\Delta\tau c) - \|AB\|\cos(\theta))}\sin(\theta).$$

where c is the speed of light, $(x_A, y_A)$ the coordinates of A and $\|AB\|$ the distance between A and B.

Figure 12:
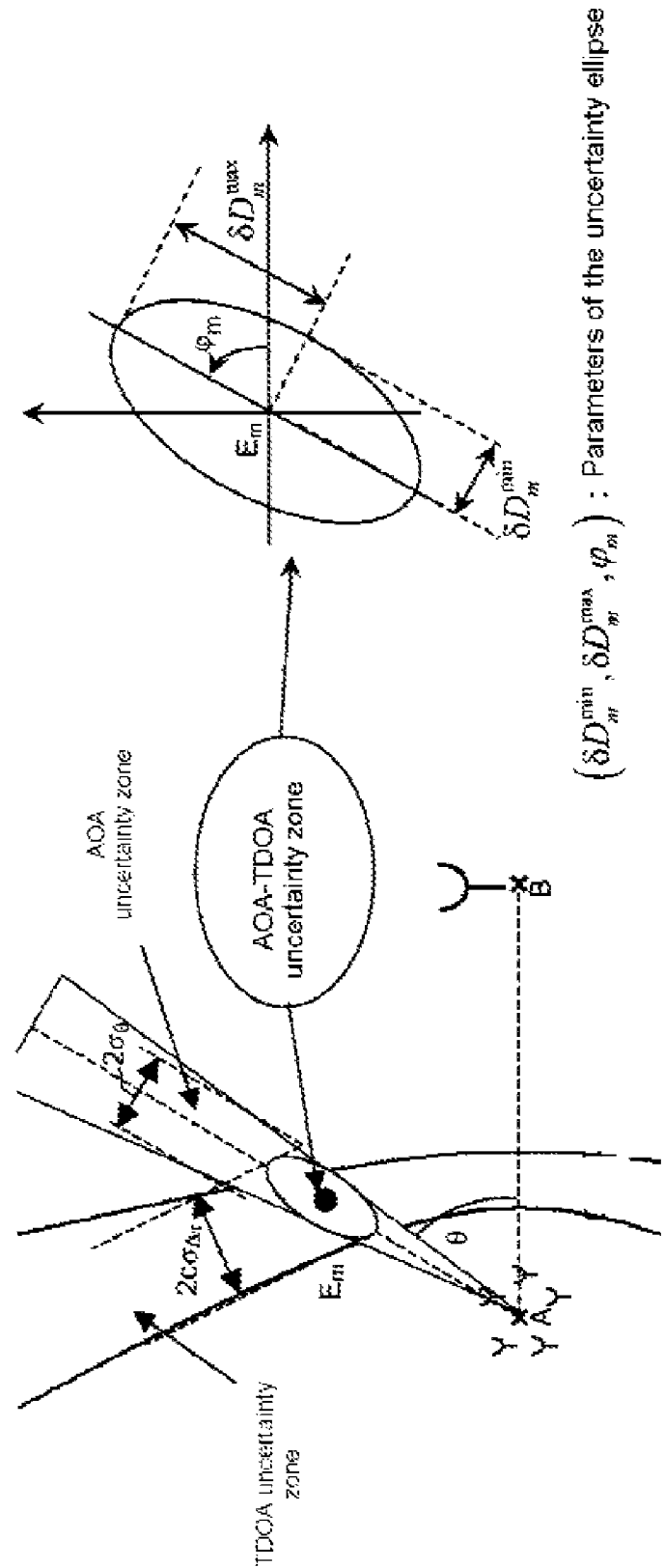

The uncertainty ellipse for the location of the transmitter at $E_m$ is constructed on the basis of a knowledge of the standard deviation $\sigma_{\Delta\tau}$ and of the mean $\overline{\Delta\tau}$ of the TDOA $\Delta\tau$ as well as of the standard deviation and of the mean $\overline{\theta}$ of the estimation of the angle of incidence "AOA" θ. The parameters of this ellipse are illustrated in FIG. 12.

The equation of the uncertainty ellipse is then $$x(t)=x_m+\delta D_m^{max} \cos(\phi_m)\cos(t)-\delta D_m^{min}\sin(\phi_m)\sin(t)$$

$$y(t)=y_m+\delta D_m^{max}\sin(\phi_m)\cos(t)+\delta D_m^{min}\cos(\phi_m)\sin(t). \quad (40)$$

for $0 \leq t \leq 360°$. The parameters of the ellipse $(\delta D_m^{min}, \delta D_m^{max}, \phi_m)$ are estimated on the basis of K points $M_k(x_k, y_k)$ with coordinates $(x_k, y_k)$ $$x_k = x_A + \frac{(\tau_k c)^2 - \|AB\|^2}{2((\tau_k c) - \|AB\|\cos(\theta_k))}\cos(\theta_k) \quad (41)$$

$$y_k = y_A + \frac{(\tau_k c)^2 - \|AB\|^2}{2((\tau_k c) - \|AB\|\cos(\theta_k))}\sin(\theta_k)$$

with $$\theta_k = \overline{\theta} + \cos\left(2\pi\frac{k}{K}\right)\sigma_\theta \text{ and } \tau_k = \Delta\overline{\tau} + \sin\left(2\pi\frac{k}{K}\right)\sigma_{\tau_m}.$$

And finally, $$\delta D_m^{max} = \max_k\left\{\sqrt{(x_k - x_m)^2 + (y_k - y_m)^2}\right\} = \quad (42)$$

$$\sqrt{(x_{k_{max}} - x_m)^2 + (y_{k_{max}} - y_m)^2}$$

$$\delta D_m^{min} = \min_k\left\{\sqrt{(x_k - x_m)^2 + (y_k - y_m)^2}\right\}$$

$$\varphi_m = \text{angle }((x_{k_{max}} - x_m) + j(y_{k_{max}} - y_m))$$

To summarize, the steps of the method for locating a transmitter and/or an obstacle according to the invention are as follows:

Step No. 1: On the basis of the knowledge of the position E0 of the reference transmitter and of those of the stations at A and B, calculate the AOA-TDOA pair $(\theta_{ref}, \Delta\sigma_{ref})$, for the transmitter E0.

Step No. 2: Initialization of the steps: k=1, $\Omega_d=\emptyset$ and $\Omega_r=\emptyset$.

Step No. 3: On the basis of the sensor signals x(t) such that $(k-1)T \leq t < kT$ apply a coherent multi-path elementary goniometry according to the steps of the sub-method of steps D, for example, giving a set of incidences $\Theta_d=\{\theta_{1d} \ldots \theta_{Md}\}$ associated with the direct paths and an incidence set $\Theta_r=\{\theta_{1r} \ldots \theta_{Pr}\}$ associated with the reflected paths.

Step No. 4: On the basis of the sets $\Theta_d$ and $\Theta_r$ as well as sensor signals x(t) such that $(k-1)T \leq t < kT$, application of the steps of the sub-method of steps E described previously, giving a set of AOA-TDOA pairs $$\Psi_d = \bigcup_i \{(\hat{\theta}_{id}, \Delta\tau_{id})\}$$

associated with the direct paths and a set of AOA-TDOA pairs $$\Psi_r = \bigcup_i \{(\hat{\theta}_{ir}, \Delta\tau_{ir})\}$$

associated with the reflected paths.

Step No. 5: $\Omega_d=\Omega_d \cup \Psi_d$ and $\Omega_r=\Omega_r \cup \Psi_r$.

Step No. 6: k=k+1, if k<K then return to step No. 3.

Step No. 7: On the basis of the set of data $\Omega_d$, extract the total number M of transmitters as well as the mean and standard deviation values of the AOA-TDOA parameters of each of the direct paths so as to obtain $$\overline{\Omega}_d = \bigcup_i \{(\overline{\theta}_{md} \text{ and } \sigma_{\theta_{md}}, \Delta\overline{\tau}_{md} \text{ and } \sigma_{\Delta\tau_{md}}) \text{ for } 1 \leq m \leq M\}$$

where $\overline{\theta}_{md}$ and $\sigma_{\theta_{md}}$ are the mean and standard deviation values of the incidence of the $m^{th}$ transmitter and $\Delta\overline{\tau}_{md}$ and $\sigma_{\Delta\tau_{md}}$ are the mean and standard deviation values of the TDOA of this same transmitter according to a technique known to the person skilled in the art.

Step No. 8: On the basis of the set of data $\Omega_r$ extract the total number P of reflectors as well as mean and standard deviation values of the AOA-TDOA parameters of each of the direct paths so as to obtain $$\overline{\Omega}_r = \bigcup_i \{(\overline{\theta}_{pr} \text{ and } \sigma_{\theta_{pr}}, \Delta\overline{\tau}_{pr} \text{ and } \sigma_{\Delta\tau_{pr}}) \text{ for } 1 \leq p \leq P\}$$

where $\overline{\theta}_{pr}$ and $\sigma_{\theta_{pr}}$ are the mean and standard deviation values of the incidence of the $p^{th}$ reflector and $$\Delta\overline{\tau}_{rd} \text{ and } \sigma_{\Delta\tau_{rd}}$$

are the mean and standard deviation values of the TDOA of this same reflector, the extraction can be done by one of the "clustering" techniques known to the person skilled in the art. For example, it can be carried out by applying the association method disclosed in patent FR 04 11448.

Step No. 9: On the basis of the knowledge of the incidence $\theta_{ref}$ of the reference transmitter, search the set $\overline{\Omega}_d$ for the incidence $\overline{\theta}_{m_{ref}d}$ which is closest to $\theta_{ref}$.

Step No. 10: Correct the orientation error of the antenna (sensor networks) by performing in the sets $\overline{\Omega}_d$ and $\overline{\Omega}_r$: $\overline{\theta}_{md} = \overline{\theta}_{md} + (\theta_{ref} - \overline{\theta}_{m_{ref}d})$ and $\overline{\theta}_{pr} = \overline{\theta}_{pr} + (\theta_{ref} - \overline{\theta}_{m_{ref}d})$.

Step No. 11: Correct the TDOA due to the asynchronism of the receivers at A and B by performing in the sets $\overline{\Omega}_d$ and $\overline{\Omega}_r$: $\Delta\overline{\tau}_{md} = \Delta\overline{\tau}_{md} + (\Delta\tau_{ref} - \Delta\overline{\tau}_{m_{ref}d})$ and $\Delta\overline{\tau}_{pr} = \Delta\overline{\tau}_{pr} + (\Delta\tau_{ref} - \Delta\overline{\tau}_{m_{ref}d})$, since the index $m_{ref}d$ associated with the reference transmitter was identified in step No. 9 and as the exact TDOA $\Delta\tau_{ref}$ of the reference transmitter was calculated in step No. 1

Step No. 12: On the basis of the knowledge of the mean incidences $\overline{\theta}_{mr}$ and $\overline{\theta}_{pr}$ and then of the level of the calibration errors, calculate for each of the sources according to [5] for example standard deviations $\sigma_{\theta_{md}}^{cal}$ and $\sigma_{\theta_{pr}}^{cal}$ related to the calibration errors.

Step No. 13: Correct the standard deviations of the TDOAs by taking account of the calibration errors in the sets $\overline{\Omega}_d$ and $\overline{\Omega}_r$: $\sigma_{\theta_{md}} = \sigma_{\theta_{md}} + \sigma_{\theta_{md}}^{cal}$ and $\sigma_{\theta_{pr}} = \sigma_{\theta_{pr}} + \sigma_{\theta_{pr}}^{cal}$.

Step No. 14: On the basis of the pairs $(\overline{\theta}_{md}, \Delta\overline{\tau}_{md})$ and $(\overline{\theta}_{pr}, \Delta\overline{\tau}_{pr})$, determine the positions of the transmitters $E_m(\overline{x}_{md}, \overline{y}_{md})$ and of the reflectors $R_p(\overline{x}_{pr}, \overline{y}_{pr})$ by applying the calculation of equation (39).

Step No. 15: On the basis of the pairs $(\overline{\theta}_{md}$ and $\sigma_{\theta_{md}}$, $\Delta\overline{\tau}_{md}$ and $\sigma_{\Delta\tau_{md}})$ and $(\overline{\theta}_{pr}$ and $\sigma_{\theta_{pr}}$, $\Delta\overline{\tau}_{pr}$ and $\sigma_{\Delta\tau_{pr}})$, determine the positions of the uncertainty ellipses for the transmitters with position $E_m$ and for the reflectors with position $R_p$ by applying, for example, the calculation of equations (41)(42).

The invention makes it possible to locate several transmitters. It takes into account the presence of multi-paths by giving the position of the reflectors. It does not make any assumption about the transmitted signals: they can be of different bands, with or without pilot signals. The signals can equally well be radio-communication signals or RADAR signals.

The invention claimed is:

1. A method for locating one or more transmitters Ei in the potential presence of obstacles Rp in a network comprising at least one first receiving station A and one second receiving station B asynchronous with A comprising the following steps:

the identification of a reference transmitter of known position $E_0$ by a calculation of the AOA-TDOA pair $(\theta_{ref}, \Delta\tau_{ref})$ on the basis of the knowledge of the position E0 of the reference transmitter and of those of the stations at A and B;

an estimation of the direction of arrival of the transmitter or transmitters and of the reflectors (or estimation of the AOA) on the first station A;

the separation of the signals received on the first station A by spatial filtering in the direction of the source (transmitters and/or obstacles);

the separation of the incidences originating from the transmitters from those originating from the obstacles by inter-correlating the signals arising from the spatial filtering at A;

the estimation of the time difference of arrival or TDOA of a source (transmitters and/or obstacles) by inter-correlating the signal of the source (transmitters and/or obstacles) received at A with the signals received on the second receiving station B: for each transmitter source Ei (or obstacles Rj) a pair (AOA, TDOA) is then obtained;

a synthesis of the measurements of the pairs (AOAi, TDOAi) of each source (Ei, Rp) so as to enumerate the sources and to determine the means and standard deviation of their AOA and TDOA parameters;

the determination of the error of synchronism between the receiving stations A and B by using the reference transmitter $E_0$, and then the correction of this error on all the TDOAi of the pairs (AOAi, TDOAi) arising from the synthesis;

the determination of the orientation error of the receiving station A by using the reference transmitter $E_0$, and then the correction of this error on all the AOAi of the pairs (AOAi, TDOAi) arising from the synthesis; and the location of the various transmitters on the basis of each pair (AOAi, TDOAi).

2. The method as claimed in claim 1, comprising at least one step in which an uncertainty ellipse for the measurements of standard deviation of the parameters (AOA, TDOA) is established.

3. The method as claimed in claim 1, comprising the following steps:

Step No. 2: Initialization of the steps: k=1, $\Omega_d = \emptyset$ and $\Omega_r = \emptyset$, Step No. 3: On the basis of the sensor signals x(t) such that $(k-1)T \leq t < kT$ application of an elementary goniometry, giving a set of incidences $\Theta_d = \{\theta_{1d} \ldots \theta_{MD}\}$ associated with the direct paths and an incidence set $\Theta_r = \{\theta_{1r} \ldots \theta_{Pr}\}$ associated with the reflected paths, Step No. 4: On the basis of the sets $\Theta_d$ and $\Theta_r$ as well as sensor signals x(t) such that $(k-1)T \leq t < kT$, apply a scheme for associating the angles of arrival and the TDOAs so as to obtain a set of AOA-TDOA pairs $$\Psi_d = \bigcup_i \{(\hat{\theta}_{id}, \Delta\tau_{id})\}$$

associated with the direct paths and a set of AOA-TDOA pairs $$\Psi_r = \bigcup_i \{(\hat{\theta}_{ir}, \Delta\tau_{ir})\}$$

associated with the reflected paths,

Step No. 5: $\Omega_d = \Omega_d \cup \Psi_r$

Step No. 6: k=k+1, if k<K then return to step No. 3,

Step No. 7: On the basis of the set of data $\Omega_d$ extract the total number M of transmitters as well as the mean and standard deviation values of the AOA-TDOA parameters of each of the direct paths so as to obtain $$\overline{\Omega}_d = \bigcup_i \{(\overline{\theta}_{md} \text{ and } \sigma_{\theta_{md}}, \Delta\overline{\tau}_{md} \text{ and } \sigma_{\Delta\tau_{md}}) \text{ for } 1 \le m \le M\}$$

where and $\overline{\theta}_{md}$ and $\sigma_{\theta_{md}}$ are
and
the mean and standard deviation values of the incidence of the $m^{th}$ transmitter and $\Delta\overline{\tau}_{md}$ et $\sigma_{\Delta\tau_{md}}$ are the mean and standard deviation values of the TDOA of this same transmitter according to a technique known to the person skilled in the art, Step No. 8: On the basis of the set of data $\Omega_r$ extract the total number P of reflectors as well as mean and standard deviation values of the AOA-TDOA parameters of each of the direct paths to obtain $$\overline{\Omega}_r = \bigcup_i \{(\overline{\theta}_{pr} \text{ and } \sigma_{\theta_{pr}}, \Delta\overline{\tau}_{pr} \text{ and } \sigma_{\Delta\tau_{pr}}) \text{ for } 1 \le p \le P\}$$

where $\overline{\theta}_{pr}$ and $\sigma_{\theta_{pr}}$ are the mean and standard deviation values of the incidence of the $p^{th}$ reflector and $\Delta\overline{\tau}_{rd}$ and $\sigma_{\Delta\tau_{rd}}$ are the mean and standard deviation values of the TDOA of this same reflector Step No. 9: On the basis of the knowledge of the incidence $\theta_{ref}$ of the reference transmitter, search the set $\overline{\Omega}_d$ for the incidence $\overline{\theta}_{m_{ref}d}$ which is the closest to $\theta_{ref}$, Step No. 10: Correct the orientation error of the antenna by performing in the sets $\overline{\Omega}_d$ and $\overline{\Omega}_r$: $\overline{\theta}_{md} = \overline{\theta}_{md} + (\theta_{ref} - \overline{\theta}_{m_{ref}d})$ and $\overline{\theta}_{pr} = \overline{\theta}_{pr} + (\theta_{ref} - \overline{\theta}_{m_{ref}d})$, Step No. 11: Correct the TDOA error due to the asynchronism of the receivers at A and B by performing in the sets $\overline{\Omega}_d$ and $\overline{\Omega}_r$: $\Delta\overline{\tau}_{md} = \Delta\overline{\tau}_{md} + (\Delta\tau_{ref} - \Delta\overline{\tau}_{m_{ref}d})$ and $\Delta\overline{\tau}_{pr} = \Delta\overline{\tau}_{pr} + (\Delta\tau_{ref} - \Delta\overline{\tau}_{m_{ref}d})$, Step No. 12: On the basis of the knowledge of the mean incidences $\overline{\theta}_{mr}$ and $\overline{\theta}_{pr}$ and then of the level of the calibration errors, calculate, for each of the sources, standard deviations $\sigma_{\theta_{md}}^{cal}$ et $\sigma_{\theta_{pr}}^{cal}$ related to the calibration errors and Step No. 13: Correct the values of standard deviations of the TDOAs by performing in the sets $\overline{\Omega}_d$ and $\overline{\Omega}_r$: $\sigma_{\theta_{md}} = \sigma_{\theta md} + \sigma_{\theta_{md}}^{cal}$ and $\sigma_{\theta_{pr}} = \sigma_{\theta_{pr}} + \sigma_{\theta_{pr}}^{cal}$, Step No. 14: On the basis of the pairs $(\overline{\theta}_{md}, \Delta\overline{\tau}_{md})$ and $(\overline{\theta}_{pr}, \Delta\overline{\tau}_{pr})$, determine the positions of the transmitters $E_m(\overline{x}_{md}, \overline{y}_{md})$ and of the reflectors $R_p(\overline{x}_{pr}, \overline{y}_{pr})$ Step No. 15: On the basis of the pairs ($\overline{\theta}_{md}$ and $\sigma_{\theta_{md}}$, $\Delta\overline{\tau}_{md}$ and $\sigma_{\Delta\tau_{md}}$) and ($\overline{\theta}_{pr}$ and $\sigma_{\theta_{pr}}$, $\Delta\overline{\tau}_{pr}$ and $\sigma_{\Delta\tau_{pr}}$), determine the positions of the uncertainty ellipses for the transmitters with position $E_m$ and for the reflectors with position $R_p$.

4. A system for locating one or more transmitters Ei in the potential presence of obstacles Rp in a network comprising at least one first receiving station A and one second receiving station B asynchronous with A wherein the system comprises at least one reference transmitter $E_0$ whose position is known and a programmed processor and memory containing instructions for implementing the following steps:

the identification of a reference transmitter of known position $E_0$ by a calculation of the AOA-TDOA pair ($\theta_{ref}$, $\Delta\tau_{ref}$) on the basis of the knowledge of the position E0 of the reference transmitter and of those of the stations at A and B:

an estimation of the direction of arrival of the transmitter or transmitters and of the reflectors (or estimation of the AOA) on the first station A:

the separation of the signals received on the first station A by spatial filtering in the direction of the source (transmitters and/obstacles):

the separation of the incidences originating from the transmitters from those originating from the obstacles by inter-correlating the signals arising from the spatial filtering at A:

the estimation of the time difference of arrival or TDOA of a source (transmitters and/obstacles) by inter-correlating the signal of the source (transmitters and/obstacles) received at A with the signals received on the second receiving station B: for each transmitter source Ei (or obstacles Rj) a pair (AOA, TDOA) is then obtained:

a synthesis of the measurements of the pairs (AOAi, TDOAi) of each source (Ei, Rp) so as to enumerate the sources and to determine the means and standard deviation of their AOA and TDOA parameters:

the determination of the error of synchronism between the receiving stations A and B by using the reference transmitter $E_0$, and then the correction of this error on all the TDOAi of the pairs (AOAi, TDOAi) arising from the synthesis:

the determination of the orientation error of the receiving station A by using the reference transmitter $E_0$, and then the correction of this error on all the AOAi of the pairs (AOAi, TDOAi) arising from the synthesis; and the location of the various transmitters on the basis of each pair (AOAi, TDOAi).

\* \* \* \* \*